Figure 1:
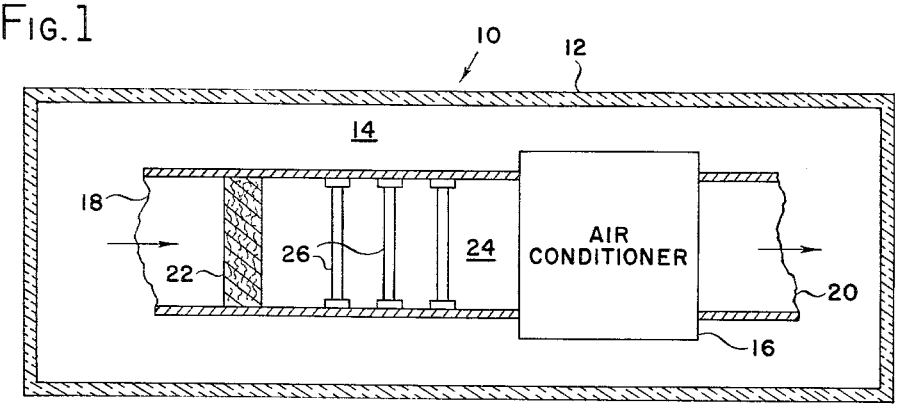

Jan. 18, 1966   W. F. HAMILTON ETAL   3,230,033
ENCLOSED CHAMBER AIR PURIFICATION APPARATUS
Filed Sept. 12, 1962   2 Sheets-Sheet 1

INVENTORS.
WILLIAM F. HAMILTON
MYRON LEVINE
ELI SIMON
BY George C. Sullivan
Agent

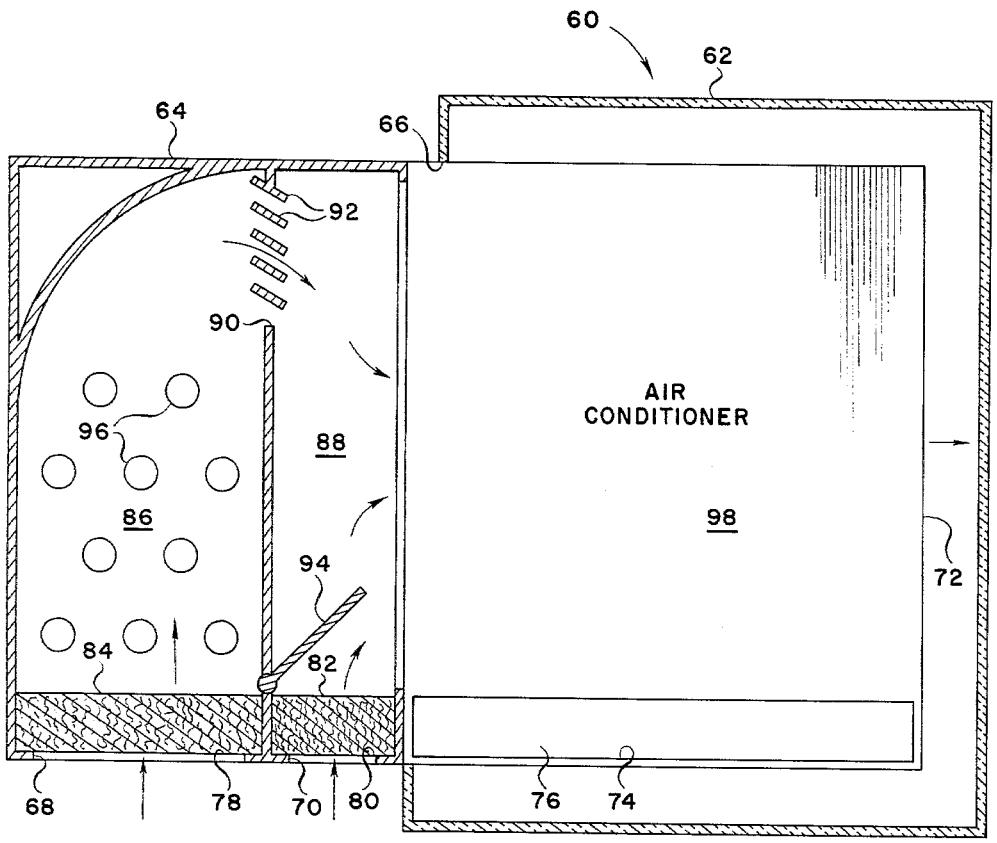

United States Patent Office 3,230,033
Patented Jan. 18, 1966

3,230,033
ENCLOSED CHAMBER AIR PURIFICATION APPARATUS
William F. Hamilton, Altadena, and Myron Levine and Eli Simon, Los Angeles, Calif., assignors to Lockheed Aircraft Corporation, Burbank, Calif.
Filed Sept. 12, 1962, Ser. No. 223,370
10 Claims. (Cl. 21—74)

This invention pertains to the field of air purification. This application is related to a patent issued to Hamilton et al. 3,084,024 application Serial No. 854,015, entitled, Chemical Smog Control, filed November 19, 1959. The entire disclosure of this copending application is incorporated herein by reference.

Air pollution is always a subject matter of importance, particularly when such pollution reaches levels capable of being detected by the physical senses of human beings. It is also a subject matter of major importance in various fields when it does not reach levels of pollution which are capable of being detected by a person's physical senses. Thus, for example, unnoticed or undetected air pollution can be very significant in the results achieved in growing certain types of plants or in raising certain types of animals. Such pollution can also influence a person's reactions even though a person cannot detect it by his or her physical senses.

In the past, the abatement of such pollution in the open atmosphere has been studied extensively, and many proposals have been advanced for the control of atmospheric pollution by decreasing the concentration of pollutants released into the atmosphere. This work continues at this time, and a number of different types of catalytic oxidizers, after-burners and the like are currently being developed and tested for the purpose of controlling the release of gases capable of causing irritation in the atmosphere. These investigations in the field of atmospheric pollution unquestionably have the potential of leading to the alleviation of so-called "smog" and similar conditions encountered in the open air in many areas.

It is not normally recognized that the problem of abatement of air pollution in completely enclosed areas is different from the problem of abating pollution in so-called open air. It is also not normally recognized that there is a need for very careful control of air pollution in enclosed structures even when such pollution is below levels capable of being detected by a person's normal physical senses. These factors are related to the ability to control such pollution in enclosed areas without legal problems and enabling legislation. Various legal problems which are encountered in controlling pollution in so-called open air are not significant with respect to the control or abatement of air pollution in enclosed structures such as green houses, aviaries, office buildings, vehicles, or the like, since enclosed structures of these types are subject to purely private ownership.

An object of the present invention is to meet the need for abatement or control of air purification in such completely enclosed areas or structures. A related object of the present invention is to provide in combination with an enclosed area or structure various devices which can be used for the broad purpose of "air purification" by controlling the presence of certain important air pollutants in such areas or structures. A further related object of the present invention is to provide devices of this type which may be easily and conveniently constructed at a comparatively nominal cost, and which are capable of being used as required, and which are effective for their intended purposes.

Another object of this invention is to provide processes for the abatement of air pollution within enclosed areas.

These and various other objects of this invention as well as many specific advantages of it will be apparent from a detailed consideration of the remainder of this specification, the appended claims and the accompanying drawings.

Figure 2:
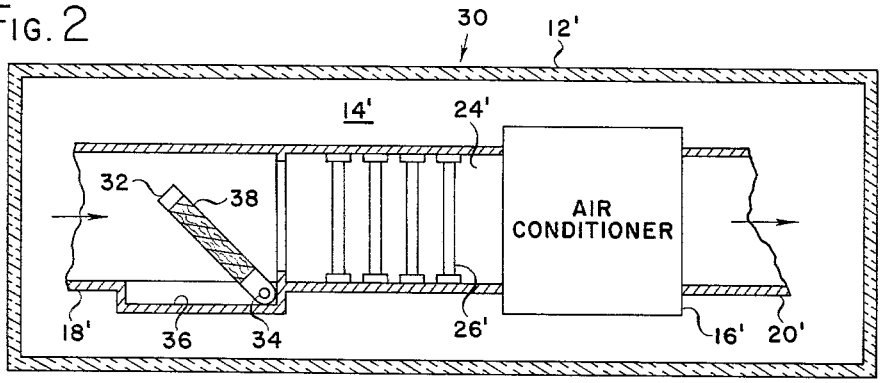
Figure 3:
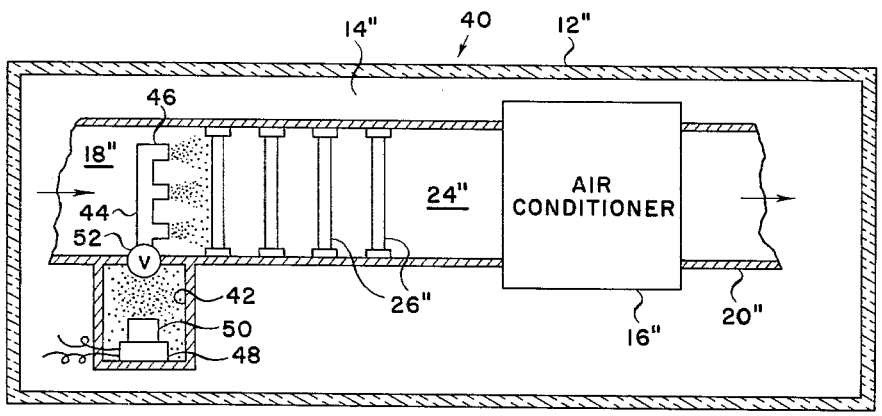

In the drawings:
FIGURE 1 is a diagrammatic view of a device of this invention;
FIGURE 2 is a diagrammatic view of a modified device of this invention;
FIGURE 3 is a diagrammatic view of a further modified device of this invention; and
FIGURE 4 is a cross-sectional view of a domestic type of air purification unit embodying this invention.

The accompanying drawings are primarily intended for explanatory purposes in order to aid or facilitate in an understanding of certain presently preferred embodiments or forms of devices of this invention. For a careful consideration of this drawing and of the remainder of this specification it will be realized that the principles or features of the present invention can be embodied within a number of differently appearing devices through the use or exercise of routine engineering skill or ability.

As an aid to understanding this invention it can be stated in summary form that it concerns what is broadly considered as air purification within a completely enclosed area or structure by circulating the air within such an area or structure through means for placing iodine within such air and then passing such air containing iodine past means for radiating the air-iodine mixture in order to cause certain reactions of a type hereinafter described. When both of these means are employed in the intended manner the process of this invention serves to activate the iodine so as to cause this material to react with pollutant materials and/or with potential pollutants or irritants in the air so as to prevent the formation of reaction products of a type capable of affecting the human senses or capable of affecting the growth of various plants and animals.

This latter is best explained by considering in detail the nature of common atomspheric pollution such as is encountered in outdoor as well as indoor areas. Perhaps the most significant primary pollutants normally encountered are various nitrogen oxides and various different hydrocarbons of which those of the olefin series are most important. The nitrogen oxides present in air normally react in the presence of radiation from the sun and in the presence of other materials so as to produce ozone. Such ozone reacts with various hydrocarbons present so as to provide virtually an indeterminate series of organic oxidation products such as various aldehydes, ketones and the like, which oxidation products are objectionable pollutants. The further reaction of them with oxygen is considered to give rise to the formation of various free radicals which in turn react with oxygen to form objectionable peroxide type free radicals which then in turn react with additional oxygen to produce further ozone. This ozone reacts with the hydrocarbons present so as to create a cyclic type of pollutant reaction which is sustained by the free radicals formed during the process as well as by the reaction of nitrogen oxides with oxygen.

This invention differs from the conventional approach to the atmospheric pollution problem by not attempting to interfere with the presence of various nitrogen oxides and hydrocarbons present within the atmosphere, but by controlling these various compounds through the use of iodine so that they do not produce irritants. When iodine is added to an atmospheric area containing various pollutants of the type indicated in this discussion it does not react with these materials to any significant extent under normal circumstances. When, however, a mixture of iodine and various pollutants, as indicated herein, is subjected to radiation from within the range of about 3000 to 6000° A. the iodine within this mixture is dissociated to a reactive form. In this reactive form the iodine is considered to react with any ozone present so as to destroy this compound. In adition, such dissociated iodine is considered to quench or tend to stop any free radical reactions by various pollutants in the reaction mixture. As a consequence of these factors the production of irritants is to all effects and purposes stopped when iodine is used as herein described.

Iodine is used with the present invention because of the fact that it is capable of reacting with ozone as indicated in the preceding paragraph and because of the fact that it is considered much more reactive in quenching free radical reactions than other halogens or other different types of compounds. The extreme effectiveness of iodine in these regards enables the results of this invention to be achieved with the addition of a minimum amount of material to any specific atmospheric mixture. The amount of iodine which should be employed with the present invention should, of course, be proportioned according to the quantity of ozone and various hydrocarbons present in the air mixture being treated as herein described. This quantity can be regulated through the use of devices as are set forth in this specification so as to supply sufficient iodine to effectively counteract the presence of any specific quantity of pollutant.

Trace quantities of iodine in the order of 0.1 p.p.m. by volume of iodine in air containing 0.7 p.p.m. by volume of ozone will reduce the ozone concentration in the air to essentially zero. Lesser quantities of iodine are, of course, effective in this regard, but do not eliminate the ozone in air upon all occasions. As a matter of practicality, the ozone concentration of an atmosphere has to be taken as a level of atmospheric irritation because of difficulties in measuring the presence of free radicals and of various different oxidized hydrocarbons.

In practicing the present invention it is not considered to be material if an excess of iodine over and above the amount of iodine necessary in order to eliminate ozone and to quench various free radical reactions is present. Rather extensive studies of the effect of iodine on humans have indicated that up to about 0.5 p.p.m. by volume of this material in the air can be easily tolerated, and that concentrations of about 1 p.p.m. are necessary in order to cause slight eye and respiratory irritation in most people. These studies have also indicated that the presence of iodine in the air breathed by a person is beneficial in preventing goiter and various minor infections such as colds and the like. Experience has also indicated that temporary exposure to high concentrations of iodine in the air only causes temporary irritation and does not result in any cumulative ill effects. Because of these factors it is considered that in practicing the present invention the iodine concentration within an enclosed area or structure should be maintained so as to be no greater than 0.5 p.p.m.

As indicated in the preceding, a mixture of air containing various fluids and iodine in practicing this invention is radiated to within the range of from 3000 to 6000° A. This range is used in the present invention because of its effectiveness in causing the dissociation of iodine into a reactive form. In general, if radiation above about 600° A. is employed insufficient dissociation of iodine may be caused by such radiation to be of significant benefit. The reactant mixture with this invention can be radiated with radiation below about 3000° A. and still obtain dissociation of iodine. However, radiation below about 3000° A. is preferably not employed with this invention because of the fact that such radiation tends to be effective in producing ozone. Since one of the purposes of the present invention is to reduce the amount of ozone present, no net benefit would be obtained by activating iodine under conditions which are productive of one of the compounds which iodine is used to eliminate.

It is commonly recognized that reactions of the type employed with the present invention are related to both time and temperature considerations. It is normally preferred to carry out the present invention at ambient temperatures since it is at these temperatures that the various reactions leading to the production of irritants in any specific atmosphere are primarily encountered. However, the present invention can be carried out with an air mixture as described in this specification at virtually any temperature above normal ambient temperature where the reactions leading to the production of irritant type pollutants can take place. This invention can also be carried out at temperatures below ambient temperatures within the range where these same reactions can ocur. It is considered that in many instances it is preferred to cool an air-iodine mixture below ambient temperature in order to prolong the time when the dissociated iodine will exist in such a mixture because of the effect of this dissociated iodine in quenching various free radical reactions.

In FIGURE 1 of the drawing a structure 10 for carrying out this invention is shown. This structure 10 includes an enclosure 12 defining a completely enclosed air space 14 within which air is constantly recirculating through an air conditioner 16 by the use of separate intake and outlet manifolds, 18 and 20, respectively. The enclosure 12 may be the walls of a conventional building such as an office building, a green house, an aviary or the like, or the body of a bus or similar type vehicle or the fuselage of an aircraft.

Within the structure 10 in the intake manifold 18 a filter 22 of a porous, absorptive material such as cotton may be located so that substantially all of the air passing through this manifold 18 to the air conditioner 16 passes through this filter. When this filter is saturated with a volatile mixture of a solution of iodine such as a common potassium iodide-iodine aqueous solution a quantity of iodine will be varopized into the air passing through this filter resulting in an air-iodine mixture. This mixture will pass through a region 24 in the intake manifold 18 in which a plurality of lamps 26 capable of giving off radiation within the range indicated in the preceding discussion will serve to dissociate the iodine within this mixture so as to cause various reactions and effects as previously described. The lamps 26 can be common, so-called "black light" commercially available lamps.

The reaction mixture will pass from this region 24 through the air conditioner 18 and the outlet maniford 20 into the air space 14. As the mixture passes through the region 24 various reactions as previously described will commence; they will tend to continue as the mixture moves through the air conditioner 18 into the space 14. Normally dissociated iodine will be present in the air returned to this air space 14 so as to be effective in quenching free radical reactions within this air space. Such reactions will, to some extent, tend to be quenched by contact with the interior of the enclosure 12 and various objects and persons within this enclosure.

In FIGURE 2 of the drawing there is shown a modified structure 30 of the present invention which is closely related to the structure 10. Because of this close relationship those parts of the structure 30 which are the same or substantially the same as parts of the structure 10 are not separately described herein and are designated in this description and in the accompanying drawing by the primes of the numerals previously used to describe them. In the structure 30 the filter 22 is replaced by a small frame 32 which is mounted on a shaft 34 at one side of the intake manifold 18' in such a manner that the position of this frame may be changed so that the frame either rests in a recessed cavity 36 at one side of the manifold 18' or extends across all or any part of the interior of the manifold 18'. Although the interior of the frame 32 can be formed in the same manner as the filter 22 so as to hold an aqueous iodine solution, it is considered preferable to locate within this frame 32 a porous cartridge 38 of a material holding iodine in such a manner that this iodine may be directly vaporized into an air stream without humidifying this air stream. Such material may be any one of a number of known zeolitic-molecular type materials.

In FIGURE 3 of the drawing there is shown a further modified structure 40 of the present invention. This structure 40 is also similar to the structure 10 previously described. Those parts of the structure 40 which are the same as or substantially the same as various parts of the structure 10 are not separately identified herein and are designated both in the drawing and in this specification by the double primes of the numerals previously used in conjunction with them.

In the structure 40 a small chamber 42 is located at one side of the bottom of the inlet manifold 18″. This chamber is connected to the interior of this manifold through a distributing manifold 44 having a plurality of outlets 46 facing the lamps 26″. Within the interior of the chamber 42 there is located a small electrically operated, thermostatically controlled electric heater 48 which is used for the purpose of heating a container 50 in order to vaporize iodine crystals located within this container. As such vaporization occurs the iodine fumes will be injected into the manifold 18″ through outlets 46 so as to create an iodine-air mixture. If desired, an auxiliary vane-type valve 52 may be located at the inlet to the distributing manifold 44 from the chamber 42 so as to facilitate regulation of the flow of iodine into the manifold 18″.

From a consideration of the structures 10, 30 and 40 described in the preceding it will be realized by those skilled in the field of air purification that virtually an indeterminate number of differently constructed structures can be built so as to utilize the principles of the present invention embodied within the structures 10, 30 and 40. They will further realize that the air conditioning units described herein can be of either a type in which the air treated is not "scrubbed" with water or of such a type where water is used. If the air conditioner used is of a type employing liquid contact with the air stream, preferably the lamps and the means for introducing iodine are located a substantial distance from the air conditioning unit in order to allow adequate time for the reactions indicated in this specification to take place. If desired, it is to be understood that the present invention can be practiced with only the fans of the air conditioners described operating. It is also to be understood that air directly from the atmosphere surrounding any of the structures 10, 30 or 40 can be introduced directly into any of these structures either through the inlet manifolds described or otherwise as desired.

In FIGURE 4 there is shown a structure 60 which is designed for use in conjunction with an enclosure 62 corresponding to the enclosure 12 previously described. This structure 60 includes a housing 64 which is designed to be mounted within an opening 66 such as a window in the enclosure 62 so that air from outside of the enclosure 62 may be taken in through inlets 68 and 70 and conveyed through it to an outlet 72 leading into the interior of the enclosure.

The bottom of the housing 64 is formed so as to have a bottom drawer slot 74 which holds a removable filter tray 76. This tray 76 is in the nature of a drawer and contains open bottom compartments 78 and 80 fitting over the inlets 68 and 70, respectively. Within the compartment 80 there is located a conventionally porous air filter 82; within the compartment 78 there is located a filter 84 corresponding to the filter 22 previously described.

A radiation chamber 86 is formed within the housing 64 directly above the filter 84 and plenum chamber 88 is formed in the housing 64 directly above and in communication with the filter 82. The upper extremities of the chambers 86 and 88 are connected by an opening 90 which is adapted to be closed by conventional adjustable louvers or vanes 92. These louvers 92 extend between walls of the housing 64 generally across the opening 90. If desired, a shut-off vane 94 can be mounted in a similar manner so as to be capable of being moved in order to cover the air filter 82 in order to prevent any air from passing through this filter. The vane 94 is of convenitonal type, and the position of it may be adjusted as desired.

Within the radiation chamber 86 a plurality of spaced lamps 96 corresponding to the previously described lamps 26 are mounted on the walls of the housing 64 so as to extend completely across this chamber 86. In the structure 10 the plenum chamber 88 is connected at its side remote from the radiation chamber 86 to inlets 68 of a conventional type of domestic air conditioning unit 98. This unit 98 includes a fan (not shown) capable of being operated separately from the remainder of it; the unit 98 connects to the outlet 72.

During the operation of the structure 60 air is drawn in through the inlet 68 through the filter 84. As the air passes through this filter 84 it will "pick up" quantities of iodine vapor, and the air-iodine mixture passing into the chamber 86 will be subjected to radiation from the lamp 96. This radiated gaseous mixture will pass through the louvers 92 into the plenum chamber 88 and thence will move through the air conditioning unit 98 and into the interior of the enclosure 62.

Various reactions as previously described will take place as the air moves in this manner. At any time air from outside of the enclosure 62 may be by-passed around the filter 84 by positioning the vane 94 in an open position and by closing the vanes or louvers 92. If desired a mixture of treated and untreated air may be passed through the structure 60 by partially opening the louvers 92 and the vane 94.

The structure 60 is considered to be particularly advantageous for many different uses in as much as it can be built so as to in effect form a part of an existing, conventional air conditioning unit. Whenever it is necessary to replace the filter 84 so as to provide a fresh quantity of iodine for use in connection with the structure 60 the tray 76 may be withdrawn from the structure so as to permit the old filter to be removed from it and a new filter to be dropped in place in replacement for the old.

Because of the nature of this invention it is to be considered as being limited solely by the appended claims forming a part of this disclosure.

1. A device for use in abating air pollution in a hollow enclosed chamber which includes, in combination:
   (a) manifold means for use in circulating air into the hollow chamber;
   (b) means for moving air through said manifold means;
   (c) a dispenser retained in said manifold for introducing iodine into air being circulated through said manifold means; and
   (d) means for radiating an air-iodine mixture within the range of 3,000–6,000° A. to dissociate the iodine created by the introduction of iodine into said manifold means as said air-iodine mixture moves through said manifold means and into the enclosed chamber.

2. A device as defined in claim 1 wherein said dispenser is a filter containing said iodine adjustably mounted in said manifold means and is capable of being moved so as to extend across any part of the interior of said manifold means.

3. A device as defined in claim 1 wherein said dispenser is a filter which includes at porous, absorptive material saturated with an aqueous solution containing iodine.

4. A device as defined in claim 1 wherein said dispenser is a porous cartridge filter containing a zeolitic-molecular sieve material containing iodine.

5. A device as defined in claim 1 wherein said dispenser for introducing iodine comprises:
  (a) means for containing iodine crystals;
  (b) means for heating said crystals so as to cause vaporization of iodine; and said device further includes
  (c) means for conveying iodine vapor into the interior of said manifold means.

6. A device as defined in claim 1 further comprising:
  (a) wall means within said manifold means downstream of said means for radiating, a passage being provided through said wall means;
  (b) adjustable structure in said passage for variably opening and closing said passage; and
  (c) a variably controllable opening means having a filter disposed therein downstream of said wall means for introducing air into said manifold so as to bypass said dispenser and said means for radiating.

7. A device for use abating air pollution within an enclosed chamber which includes:
  (a) manifold means for use in circulating air into the enclosed chamber;
  (b) means for moving air through said manifold means;
  (c) means for introducing iodine into air being circulated through said manifold means, said means for introducing iodine comprising a dispenser containing a potassium iodide-iodine solution positioned in said manifold means to intercept at least a portion of the air moved therethrough; and
  (d) means for dissociating an air-iodine mixture created by the introduction of iodine into the air in said manifold means as said air-iodine mixture moves through said manifold means and into the enclosed chamber.

8. A device as defined in claim 7 wherein said dispenser comprises filter means containing the potassium iodide-iodine solution.

9. A device as defined in claim 8 wherein said filter means is positioned so as to extend completely across the interior of said manifold means so that all the air passing through said manifold means passes through said filter means.

10. A device as defined in claim 8 wherein said filter means is adjustably mounted in said manifold means and is capable of being moved so as to extend across any part of the interior of said manifold means.

References Cited by the Examiner
UNITED STATES PATENTS

| | | | |
|---|---|---|---|
| 2,150,263 | 3/1939 | Chesney | 21—74 |
| 2,218,190 | 10/1940 | Anderson | 21—74 |
| 2,335,056 | 11/1943 | Grison | 21—74 |
| 2,394,887 | 2/1946 | Berl | 23—4 |
| 3,084,024 | 4/1963 | Hamilton et al. | 23—4 |

MORRIS O. WOLK, *Primary Examiner.*

DONALL H. SYLVESTER, *Examiner.*